Dec. 16, 1930.  W. R. PINNEO  1,785,390
TIRE BOOT
Filed May 23, 1927
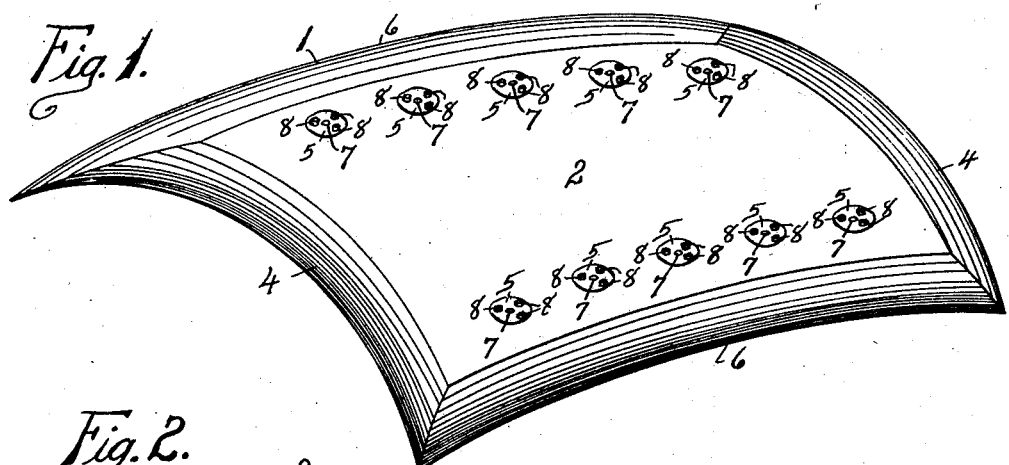
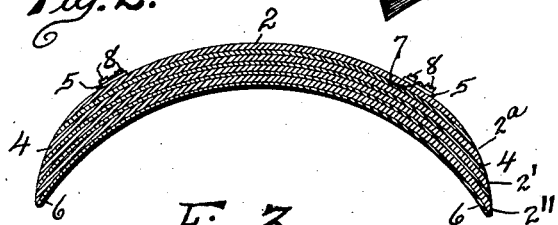
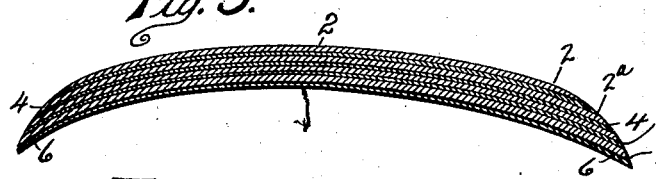
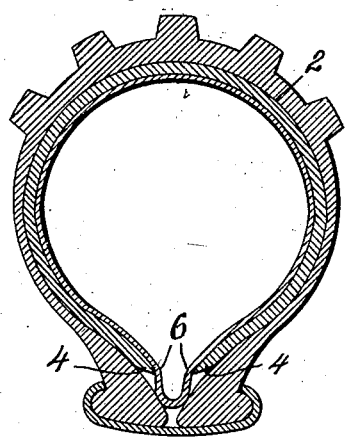
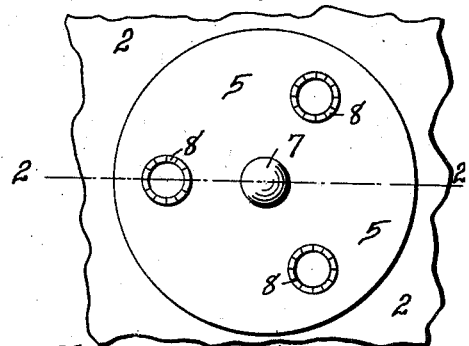
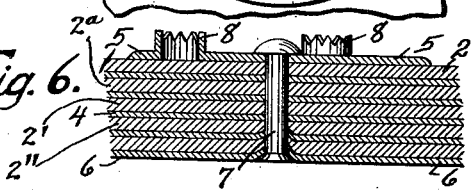
Inventor:
Walter R. Pinneo.
By Silas Le Sweet
Attorney.

Patented Dec. 16, 1930

1,785,390

UNITED STATES PATENT OFFICE

WALTER R. PINNEO, OF MARSHALLTOWN, IOWA

TIRE BOOT

Application filed May 23, 1927. Serial No. 193,546.

This invention relates to tire boots and has for an object to provide an improved tire boot which will remain in place after being placed in a tire.

Still another object is to provide a tire boot having a plurality of toothed disks secured thereto, the pressure from the air in the tube causing said teeth to engage the inner side of the casing.

With these and other objects in view, I have invented an improved tire boot, illustrated in the accompanying drawings, in which:

Figure 1 is a perspective view of my improved tire boot;

Figure 2 is a transverse sectional view thereof;

Figure 3 is a longitudinal sectional view thereof;

Figure 4 is a transverse sectional view of a tire embracing my invention;

Figure 5 is a broken away enlarged portion of the shoe showing a detail of the metal disk; and Figure 6 is a section on line 2—2 of Figure 5.

Like reference characters indicate like parts throughout the following specification, and in the several views in the drawings in which 1 represents my improved tire boot, which is a flexible body formed of a series of layers 2, 2', 2'', 2a, of a suitable pliable material, cemented together, said layers being graduated in size and provided with beveled edges forming feather side and end edges 4 for the shoe the upper layer 2 being the smallest and outer layer while the lower layer 2'' is the largest and inner layer. Adjacent the longitudinal edges of the layer 2, and disposed in spaced relation thereto are provided a series of disks 5 spaced from each other longitudinally of the boot, having a plurality of struck out portions to form circumferentially spaced openings through the disks, forming teeth 8 which are adapted to bite into the inner surface of the tire whereby the shoe will be effectually prevented from slipping from its proper position within the tire. Each of the disks 5, is held in position by means of rivets 7 having heads at their outer ends bearing against the outer faces of the disks, which also assist in binding together the layers of material contained in the shoe. The bevelled edges 4 of the shoe are bevelled on the outer surface of the shoe to knife edges 6, in order that when the inner tube is filled with air it will lie against an entirely smooth, outer surface of the inner layer 2'', thus avoiding injuring the tube as is the case with the present form of shoe patches.

Having described my invention, that which I claim to be new, and desire to procure by Letters Patent, is:

A device of the character described comprising a flexible body consisting of superposed layers of pliable material, rows of flat metal disks disposed in spaced relation to opposite side edges of said body, the disks of each row being spaced from each other longitudinally of the body, and fasteners for said disks passed through the disks centrally thereof and through said body and having heads at their outer ends bearing against the outer faces of the disks, portions of each disk between its fastener and the margin of the disk being struck outwardly to form circumferentially spaced openings through the disk and an outstanding bordering flange for each opening, the bordering flanges being serrated to form teeth adapted to bite into a tire casing and prevent the device from slipping.

In testimony whereof I affix my signature.

WALTER R. PINNEO.